United States Patent [19]

Moss

[11] B 4,045,909

[45] Sept. 6, 1977

[54] HYDROPONIC NUTRIENT FEEDING AND DRAINING SYSTEM

[75] Inventor: John H. Moss, Phoenix, Ariz.

[73] Assignee: Hydroculture, Inc., Glendale, Ariz.

[21] Appl. No.: 427,443

[22] Filed: Dec. 26, 1973

[44] Published under the second Trial Voluntary Protest Program on February 20, 1976 as document No. B 427,443.

Related U.S. Application Data

[63] Continuation of Ser. No. 260,974, June 8, 1972, abandoned.

[51] Int. Cl.² ............................................. A01G 31/02
[52] U.S. Cl. ............................................. 47/62; 61/13; 137/596; 239/428.5
[58] Field of Search ............... 47/1, 1.2, 1.4, 17, 47/18, 38, 38.1, 48.5; 239/428, 428.5, 569–572; 137/565, 568–570, 596; 261/28–30; 210/169; 417/150, 151; 61/12, 13

[56] References Cited

U.S. PATENT DOCUMENTS

| 316,804 | 4/1885 | Messinger | 417/151 |
|---|---|---|---|
| 333,086 | 12/1885 | Strickland | 417/151 |
| 475,716 | 5/1892 | Bills | 417/151 |
| 2,060,735 | 11/1936 | Krueger | 47/1.2 |
| 2,162,074 | 6/1939 | Everson | 210/169 |
| 2,233,965 | 3/1941 | Strovink | 137/565 X |
| 2,247,116 | 6/1941 | Day | 210/169 |
| 2,674,828 | 4/1954 | Tegner | 47/1.2 |
| 2,880,549 | 4/1959 | Knipe | 47/1.2 |
| 2,928,354 | 3/1960 | Bowes | 417/151 |
| 3,053,011 | 9/1962 | Plank | 137/569 X |
| 3,363,764 | 1/1968 | Whitaker | 210/169 X |
| 3,365,383 | 1/1968 | Blair | 210/169 X |
| 3,451,162 | 6/1969 | Rasmussen | 47/1.2 |
| 3,550,319 | 12/1970 | Gaines, Jr. | 47/1.2 X |
| 3,660,933 | 5/1970 | Wong, Jr. | 47/1.2 |

FOREIGN PATENT DOCUMENTS

| 432,036 | 7/1935 | United Kingdom | 47/1.2 |

OTHER PUBLICATIONS

"Soilless Growth of Plants," Ellis & Swaney, Reinhold Publishing Corp. (1938), pp. 102-103.

*Primary Examiner*—Robert E. Bagwill
*Assistant Examiner*—E. H. Eickholt
*Attorney, Agent, or Firm*—Sughrue, Rothwell, Moin, Zinn and Macpeak

[57] ABSTRACT

Hydroponic nutrient solution is fed to a growing bed by means of a pump withdrawing liquid nutrient solution from a supply reservoir located below the bed. The nutrient solution is rapidly drained from the bed when the pump is de-energized through a dump valve having no moving parts which bypasses the solution draining from the bed directly into the supply reservoir. The dump valve consists of a hollow body having at least one drain aperture. A stream of nutrient solution under pressure passes through a nozzle in the inlet of the valve body and is discharged into the outlet of the valve body. When the pump is de-energized, a major portion of the solution draining from the growing bed passes through the aperture and drains directly into the reservoir.

1 Claim, 4 Drawing Figures

HYDROPONIC NUTRIENT FEEDING AND DRAINING SYSTEM

This is a continuation of application Ser. No. 260,974, filed June 8, 1972 and now abandoned.

This invention relates to hydroponic growing systems.

More particularly, the invention relates to a system for feeding hydroponic nutrient solution to a plant growing bed and for rapidly draining the solution back into a nutrient reservoir, thereby improving control of the aeration of the plant roots.

In growing plants hydroponically according to the so-called "bed flooding" or "gravel culture" technique, a hydroponic nutrient solution is periodically pumped into the growing beds until the beds are substantially flooded. At this point, the pump is de-energized, either automatically or manually, and the nutrient solution is drained from the beds back to a nutrient solution supply reservoir located generally below the growing beds.

In order to achieve optimum plant growth, the roots of the plants growing in the beds are alternately flooded within the nutrient solution and aerated between flooding periods.

To achieve optimum aeration, it is desirable to drain the growing beds as rapidly as possible between liquid feeding periods. In the past, it has been common practice to merely let the hydroponic nutrient solution drain back through the pump into the nutrient reservoir. To drain beds more rapidly, later workers provided an electrically actuated bypass valve either in the main nutrient supply line or in a separate drain line. However, difficulty was experienced due to breakdown or intermittent operation of the electrically actuated bypass valve. More recently, attempts have been made to incorporate a pump bypass valve which was responsive to fluid pressure or flow. While the use of these valves did result in some improvement, it was nevertheless desirable to provide a valve or other means with no moving parts for diverting the liquid into the nutrient reservoir, bypassing the pump.

Accordingly, it is a principal object of the invention to provide an improved system for feeding and draining hydroponic growing beds.

Another object of the invention is to provide a dump valve for bypassing nutrient solution directly into the supply reservoir, bypassing the nutrient supply pump.

Still another object of the invention is to provide an improved dump valve of the type described having no moving parts, which is more simply and economically constructed, and which functions with improved reliability.

These and other and more specific objects and advantages of the invention will be apparent to those skilled in the art from the following detailed description taken in conjunction with the drawings, in which.

Briefly, in accordance with the invention, I provide a hydroponic growing system including a nutrient solution supply reservoir located generally below the bottom of a hydroponic growing bed with a fluid conduit communicating between the lower portions of the reservoir and the growing bed. A nutrient solution supply pump in series in the conduit withdraws nutrient solution from the reservoir and introduces it into the growing bed when the pump is energized. When the pump is de-energized, the nutrient solution drains from the growing bed through the conduit to a dump valve in series in the conduit between the pump and the growing bed. The dump valve comprises a hollow body member having a least one aperture and a liquid nozzle member formed in the inlet of the body member for receiving nutrient solution under pressure from the pump and for discharging the solution into the outlet of the body member.

Figure 1:
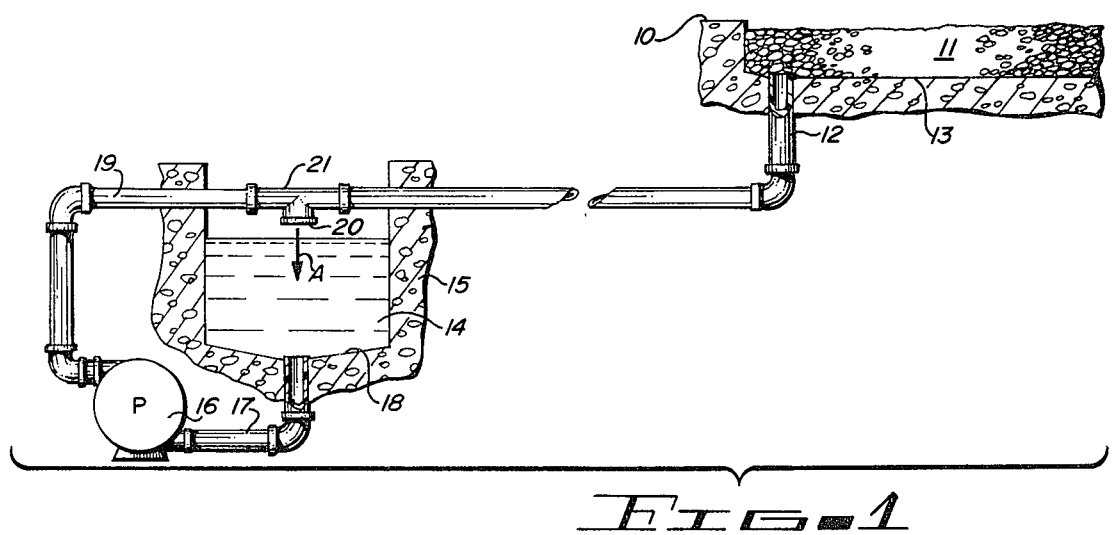
FIG. 1 is a schematic view of a typical hydroponic nutrient solution bed feeding and draining system incorporating the present invention.

Turning now to the drawings, FIG. 1 illustrates in cross-section a hydroponic growing bed 10 which is filled with gravel or other root-support media 11. The nutrient solution supply pipe 12 extends through the walls of the bed 10 and terminates near the bottom 13 of the growing bed 10. The hydroponic nutrient solution 14 is normally stored in a reservoir 15 located generally vertically below the growing bed 10. A pump 16, which may be either a variable or positive displacement pump, withdraws nutrient solution 14 through a pipe 17 which extends through the reservoir 15 and terminates near the bottom 18 of the reservoir 15. When the pump 16 is energized, nutrient solution is conducted through a feed pipe 19 into the growing bed. Pumping is continued until the bed is flooded, at which time the pump 16 is de-energized and the nutrient solution in the bed 10 drains back through the pipe 12. A relatively small portion of the nutrient solution may drain back through the pump 16 and the pipe 17 into the bottom 18 of the reservoir 15. However, according to the present invention, a major portion of the nutrient solution will drain directly into the reservoir as indicated by the arrow A through the discharge opening 20 of a dump valve 21 located in the pipe 19 between the pump 16 and the growing bed 10.

Figure 2:
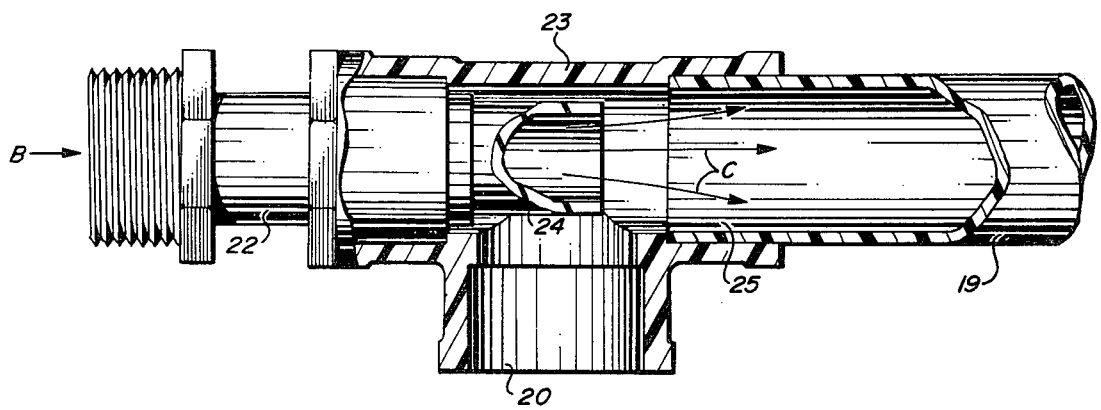
FIG. 2 is a cutaway view of the dump valve of FIG. 1.

FIG. 2 illustrates in cross-section the details of the dump valve 21 of FIG. 1. Nutrient solution under pressure flows from the supply pipe 19 in the direction of the arrow B into the inlet 22 of a hollow body member 23. The nutrient solution is discharged in the direction of the arrows C from a liquid nozzle 24 formed in the inlet 22 of the body member 23 into an outlet 25 formed in the body member 23. When the pump 16 is energized, virtually all of the nutrient solution discharged from the nozzle 24 into the inlet 25 flows on through the pipe 19 into the growing bed and very little, if any, of the nutrient solution accidentally drains out of the draining opening 20 into the nutrient reservoir.

The relative size of the openings in the nozzle 24 and inlet 25 is not highly critical so long as the force of the stream of nutrient solution ejected from the nozzle 24 is sufficiently high to prevent the drainage of substantial portions of the solution through the drain opening 20. The dump valve functions in a manner similar to a conventional aspirator. Any air entrained in the nutrient solution is not harmful.

Figure 3:
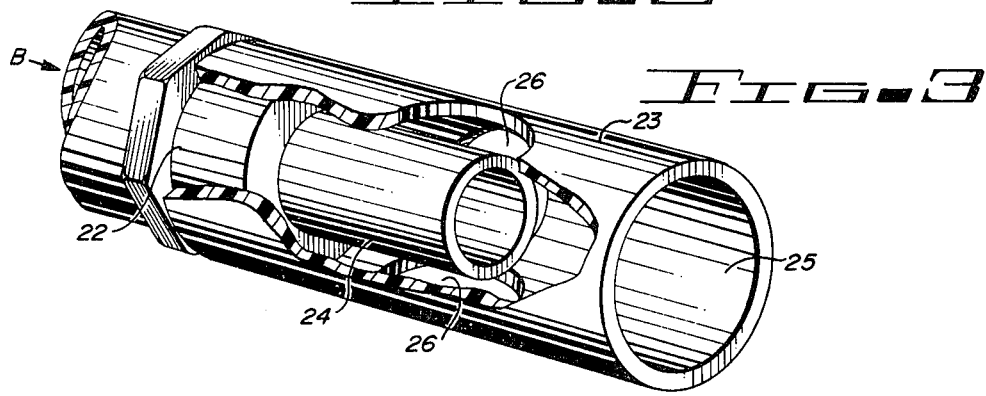
FIG. 3 is a partially cutaway perspective view of another embodiment of the dump valve of the present invention.
Figure 4:
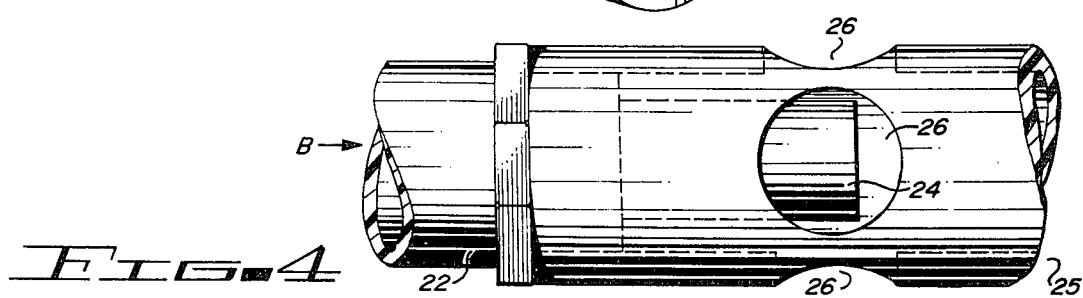
FIG. 4 is an external view of the dump valve of FIG. 3.

FIGS. 3 and 4 illustrate an alternate embodiment of the dump valve which functions similarly to the dump valve of FIG. 2 except that the hollow body member 23 is provided with a plurality of apertures 26 spaced circumferentially around the periphery of the body member 23. Those skilled in the art will appreciate, therefore, that the principal function of the hollow body member 23 is to hold the nozzle 24 and nutrient supply pipe 19 in proper coaxial alignment and could, therefore, be constructed in many various ways. For example, the body member 23 could be entirely omitted and the nozzle 24 and supply pipe 19 could simply be held in proper spaced-apart coaxial alignment by suitable pipe supports.

Having described my invention and presently preferred embodiments thereof, I claim:

1. A hydroponic growing system including:
   a. a nutrient solution supply reservoir;
   b. at least one hydroponic growing bed, the bottom of which is located higher than the normal level of nutrient solution in said reservoir;
   c. a conduit in fluid communication between the lower portion of said supply reservoir and the lower portion of said growing bed;
   d. a nutrient solution supply pump disposed in series in said conduit for withdrawing nutrient solution from said reservoir and introducing said solution into said growing bed in a first mode of operation when said pump is energized; and
   e. a dump valve in series in said conduit between said pump and said growing bed for rapidly draining nutrient solution from said growing bed into said nutrient solution reservoir, when said pump is de-energized in a second mode of operation, bypassing said pump, and dump valve comprising:
      i. a hollow body member having an inlet and an outlet,
      ii. a liquid nozzle member formed in said inlet for receiving nutrient solution under pressure from said pump in said first mode of operation and for discharging said solution into said outlet, and
      iii. means defining at least on aperture in said hollow body member intermediate of and in constant unobstructed communication with said inlet and said outlet for draining nutrient solution into said reservoir during said second mode of operation, bypassing said pump.

* * * * *